March 11, 1952 B. H. ROLLINS, JR 2,588,575
FRUIT HALVING AND PITTING DEVICE
Filed March 25, 1947 4 Sheets-Sheet 1

INVENTOR
BROOK H. ROLLINS, JR.
BY
Raymond Wootton
ATTORNEY

March 11, 1952     B. H. ROLLINS, JR     2,588,575
FRUIT HALVING AND PITTING DEVICE
Filed March 25, 1947     4 Sheets-Sheet 2
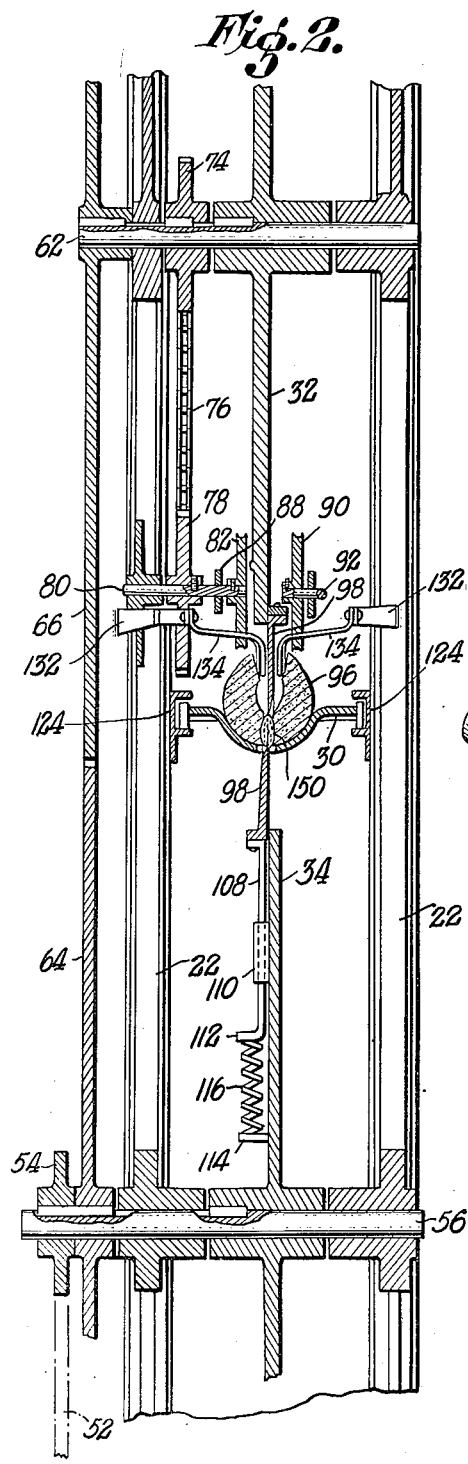
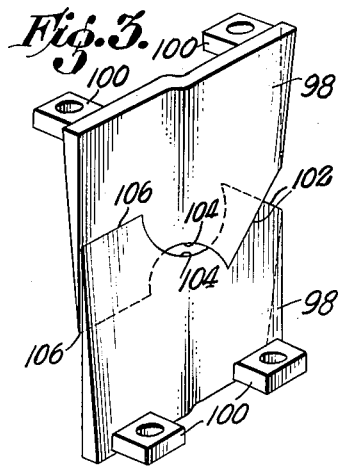
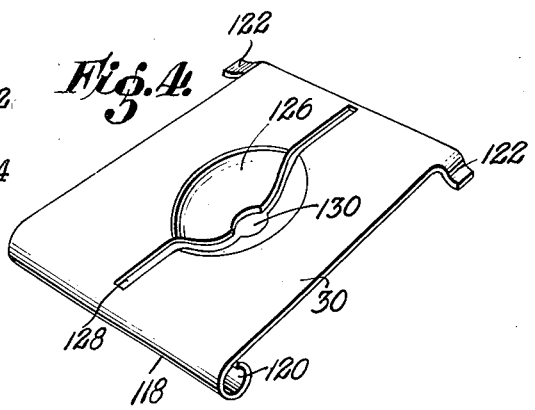
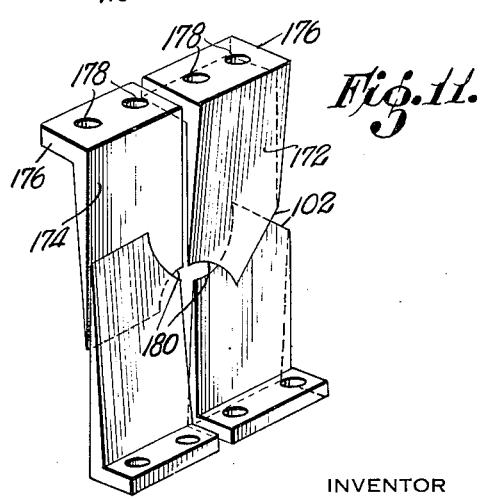
INVENTOR
BROOK H. ROLLINS, JR.
BY
Raymond Wootton
ATTORNEY March 11, 1952   B. H. ROLLINS, JR   2,588,575
FRUIT HALVING AND PITTING DEVICE
Filed March 25, 1947   4 Sheets-Sheet 3
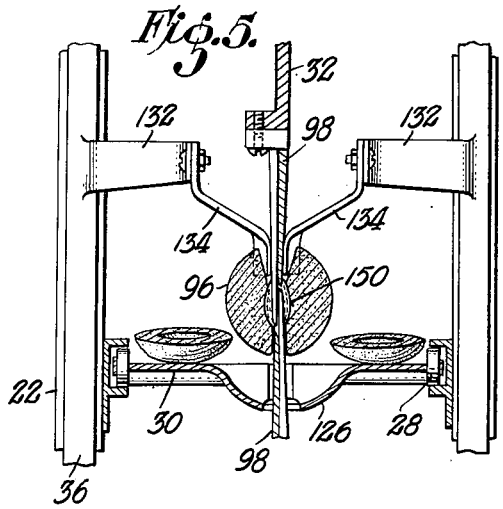
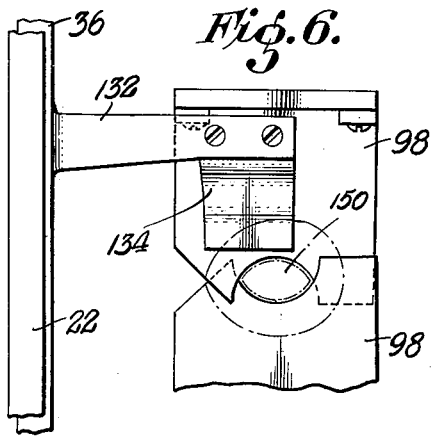
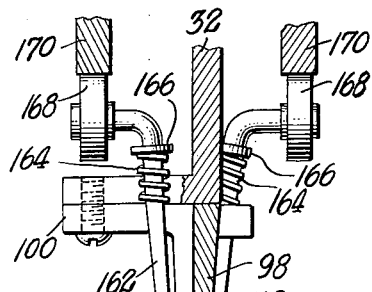
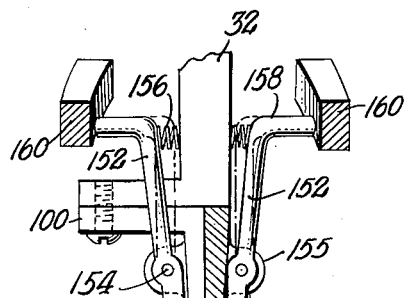
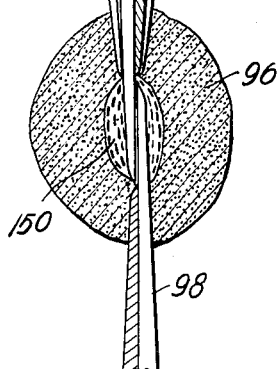
INVENTOR
BROOK H. ROLLINS, JR.
BY
ATTORNEY

INVENTOR
BROOK H. ROLLINS, JR.
BY
ATTORNEY

Patented Mar. 11, 1952

2,588,575

UNITED STATES PATENT OFFICE 2,588,575

FRUIT HALVING AND PITTING DEVICE

Brook H. Rollins, Jr., Baltimore, Md.

Application March 25, 1947, Serial No. 737,190

5 Claims. (Cl. 146—28)

In the preparation of fruit for canning, the removal of pits has been accomplished manually for the most part, despite the long recognized need for performing this operation mechanically. Machines have been proposed from time to time purporting to produce the desired results, but in every known case they have been unacceptable to the industry for various reasons. Among these reasons are the inability to handle fruits of various sizes, injury of the fruit, need for close manual supervision and inspection, and high cost both initially and for maintenance.

Whereas the apparatus contemplated by the present invention is primarily intended for the manipulation of peaches, and will be so described, it is likewise adapted for use with other fruits containing pits. It is believed that by virtue of the present invention, the major problems which have accounted for the failures in the past, have been solved. The invention contemplates fruit handling apparatus comprising a conveyor providing a fruit support which is discontinuous at least in part to define an elongated gap extending axially in the direction of movement of the conveyor, opposed cutters mounted for penetration of fruit supported on the conveyor, and means for driving the conveyor and introducing certain of the cutters through the gap so defined. The fruit support may comprise one or more pockets for receiving the fruit, in which case certain of the cutters will be introduced into the pocket or pockets through the gap. The cooperating cutters may be intersecting and overlapping and each cutter may comprise a plurality of spaced radially extending blades. Each blade may have offset portions defining aligned cutting edges, the offset portions being integral or separate, one with respect to the other. The cutters themselves are preferably rotary and their blades are preferably detachable. The blades are provided with notches for engagement with the pit of the fruit on which the operations are to be performed, and the blades are relatively yieldable to compensate for variations in the sizes of the pits to be engaged. The cutters are preferably synchronized so that the cooperating notches will register with the pit to be removed and engage it with sufficient force and for a sufficient period of time to permit the desired portion of the fruit to be removed therefrom. While the pit is so engaged, a wedging effect may be employed to cleave the fruit from the pit. This result may be accomplished by providing deflectors in the path of the fruit imparting a camming action thereto with respect to the pit. Alternately, spreading elements may be carried by the blades themselves and actuated during a predetermined portion of their path to separate the fruit while the pits are restrained. Such separating elements carried by the blades may be slidable or pivoted with respect thereto, being normally biased to an ineffective position and advanced at the prescribed time to accomplish the desired results. Whereas the cutting and pit removal may be accomplished while the fruit is resting upon the support, in some instances it will be preferable to elevate the fruit from the support during these operations.

With a view towards achieving continuous operation, the conveyor may be of the endless type and the pockets may be pivotally related thereto with a view towards obtaining a self dumping action at the end of a particular pass of the conveyor.

Whereas the major objects of the present invention have been expressed by the foregoing, further objects and a clearer understanding of the invention will follow from a detailed description of the apparatus depicted in the accompanying drawings wherein:

Fig. 2 is a sectional elevation taken along line 2—2 of Fig. 1;

Fig. 3 is a perspective view of a pair of cooperating blades;

Fig. 4 is a perspective view of a support defining a pocket;

Fig. 5 is an enlarged detail of a portion of Fig. 2;

Fig. 6 is an elevation of a portion of Fig. 5;

Fig. 8 is a fragmentary elevation illustrating a modification;

Fig. 10 is a fragmentary sectional elevation depicting a modified form of separating element like that shown in Fig. 9; and Fig. 11 is a perspective view depicting a modification of the complementary blades.

Figure 1:
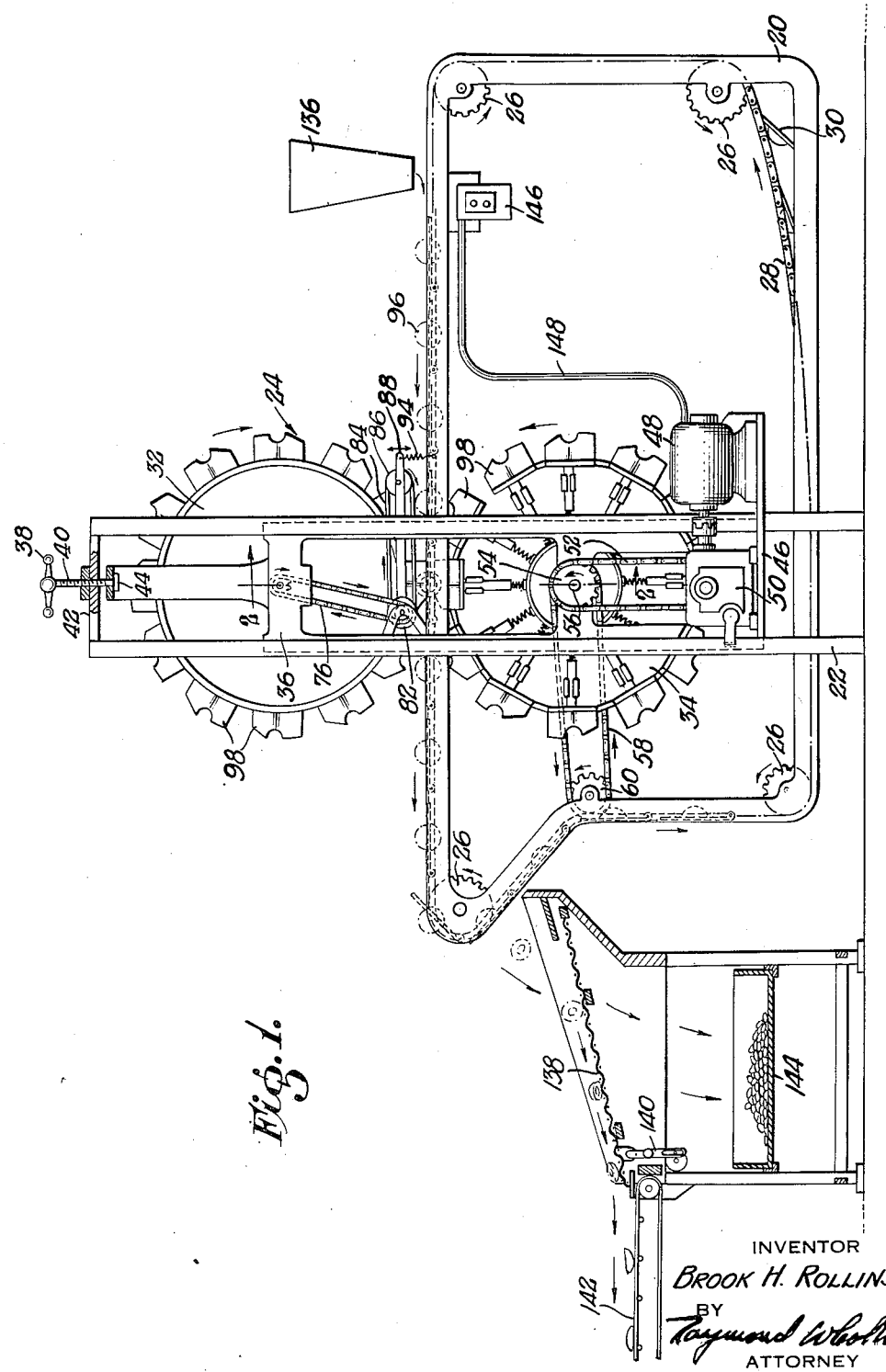
Fig. 1 is an elevation of one form of the invention.

With reference to Fig. 1, the apparatus comprises a frame 20 built up of channels or other appropriate sections having affixed thereto, vertical rails 22 for adjustably supporting the cutter assembly 24. A plurality of sprockets 26 are journaled in the frame near its corners and at any desired intermediate position for cooperation with an endless chain 28 arranged at each side of the apparatus for advancing a plurality of fruit supporting elements 30 with respect to the cutter assembly.

The cutter assembly comprises an upper rotor 32 and a lower rotor 34 suitably journaled in a frame 36 whose height is adjustable with respect to the rails 22 by means of a hand wheel 38 having a shank 40 in threaded engagement with an upper plate 42 secured to the rails. The lower end of the shank is provided with a head 44 which bears upon the frame 36 whereby the latter may be elevated or lowered to effect adjustments of the centers of the cutters or rotors 32 and 34 with respect to the upper pass of the conveyor. The lower end of the frame 36 is defined by a platform 46 constituting a support for a driving motor 48 and a variable speed reduction gear mechanism 50 suitably coupled to the motor shaft. The output shaft of the reduction gearing has secured thereto a sprocket, not shown, for driving a chain 52 which in turn drives a sprocket 54 secured to the shaft of the lower cutter or rotor 34. This shaft 56 carries another sprocket, not shown in Fig. 1, for driving a chain 58 which in turn drives a sprocket 60 through which motion is transmitted to the conveyor chain 28. It will be clear that as the cutter assembly is raised and lowered, the movements may be compensated by allowing adequate slack in the chain 58, and if desired, adjusting means may be provided in a manner well known in the art to adjust the centers of the respective sprockets.

The shaft 56 of the lower cutter is interconnected for synchronous operation with the shaft 62 of the upper rotor or cutter through a spur gear 64 mounted on the shaft 56 of the lower cutter, which meshes in a 1:1 ratio with a spur gear 66 secured to the shaft 62. A sprocket 74 is also secured to the shaft 62 for driving a chain 76 in engagement with a sprocket 78 secured to a shaft 80 to which is also secured a pulley 82 driving a belt 84. This belt is trained over a spaced pulley 86 supported in a frame 88 pivotally supported about the shaft 80. On a common shaft with the pulley 86, and located on the opposite side of the rotor 32, there is another similar pulley provided with a belt which is threaded over a pulley 90 coaxial with the pulley 82 and rotatable at the opposite side therefrom of the cutter 32 on a shaft 92. At the end of the frame 88 remote from its fulcrum, a spring 94 biases the belts downwardly for yielding engagement with the fruit 96 carried by the conveyor.

Each of the rotors or cutters 32 and 34 has bolted thereto a plurality of radially disposed blades 98 having perforated lugs 100 through which bolts are received to secure them to their respective rotors. These blades are of rigid construction and so tapered in cross section as to produce a cleaving action as they penetrate the fruits to remove it from its pit. Each of the blades depicted in Fig. 3 has an inclined leading edge 102 and a substantially central notch 104 intermediate the leading edge and the trailing edge 106. It will be noted that each trailing edge is offset with respect to its leading edge in the direction of the thickness of the blade so that an upper and lower blade will assume an intersecting and overlapping relationship when they come into registry as clearly shown in Fig. 3. Whereas the upper blades are rigidly secured with respect to their rotor 32, the lower blades are secured to a slide 108 arranged in a guide 110 for each of them, secured to the lower rotor 34. As illustrated in Fig. 2, the lower end of the slide 108 terminates in a flange 112, between which and an abutment 114 secured to the rotor, there is interposed a spring 116 for yieldably biasing each lower blade radially outwardly, providing the necessary self adjustability of the blades to compensate for pits of varying sizes.

Each supporting element 30 has its leading edge 118 formed to provide a tube 120 for the reception of a pin, not shown, for articulating the element to the conveyor chain 28. The trailing edge of the supporting element 30 provides opposed projections 122 which ride in tracks 124 secured to the frame 20 to confine the element to a predetermined path, particularly important during the cutting and pitting operation. Each supporting element is depressed to define a substantially central pocket 126 and slotted to define a gap 128 through which the blades carried by the lower rotor 34 may penetrate the fruit and engage the pits. The gap 128 is shown in Fig. 4 as having an enlarged opening 130 at the bottom of the pocket 126 through which the pits may be discharged in accordance with one contemplated mode of operation.

Secured to the rails 22 by means of brackets 132, and imposed in that portion of the path of the fruit during which its pit is firmly grasped between upper and lower cutter blades, are a pair of diverging cam-like separators 134. These separators are disposed on opposite sides of the cutter blades 98 and have their ends which first engage the fruit closely related to the cutter blades so as to enter between the halves of the fruit with a minimum risk of bruising or otherwise damaging the fruit. As the fruit advances with respect to these separators, the halves ride on the diverging surfaces thereof and are ultimately completely separated from one another and from the pit.

As somewhat diagrammatically shown in Fig. 1, the fruit is deposited in the pockets 126 of the supporting elements 30 from a hopper 136, whereupon each fruit element will be properly disposed with respect to its pocket, either manually or mechanically. As it advances, the fruit will be engaged by the belts 84, then by the cutter blades 98 and upon emerging from the cutter assembly, as the supporting elements begin their downward travel at the left end of the apparatus, they will turn on their pins and deposit the pitted fruit, and if desired the pits, upon a separating screen 138 having a suitable vibrator 140, the pit passing through the screen and the fruit moving on to a conveyor 142 carrying it to the next operation. The pits may be collected in a tray 144 arranged below the screen and the vibrator may be driven by any suitable mechanism from a desired source of power.

The driving motor 48 may be controlled from a switch 146 through which it is connected to a source of energy by means of a cable 148. As depicted in Fig. 2, the pit 150 is being separated from the fruit while the latter is resting in the pocket 126 of the supporting element 30. Under some circumstances, injury to the fruit may be reduced by performing the separating function while the fruit is elevated above its support. Such a condition has been illustrated in Figs. 5 and 6 of the drawings, having been accomplished by elevating the frame 36 with respect to its rail 22 by properly manipulating the hand wheel 38.

Figure 7:
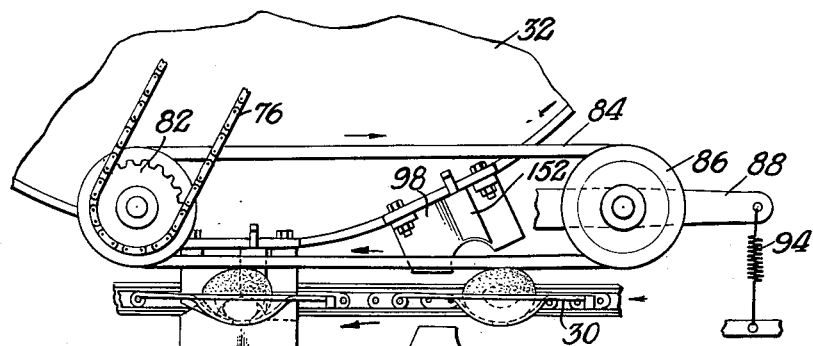
Fig. 7 is an enlarged detail of Fig. 1 showing the cutters in one adjusted position.

The modification depicted in Figs. 7 and 8 differs from that of Fig. 1 primarily in the form assumed by the separators 152. In this case, the separators have thin tapered cross sections lying close to the opposite surfaces of the upper cutter blade to which they are pivoted by means of pins 154 received in ears 155 formed on the cutter blades. The separators are normally biased by means of springs 156 adjacent their upper ends to lie flat at their lower ends against the cutter plate. Outwardly directed flanges 158 engage cam tracks 160 at the prescribed portion of the path, causing the lower ends of the separators to move outwardly with respect to the cutter blades and thus separate the two halves of the fruit from the pit. The cam element 160 may be suitably secured to the adjustable frame 36 and have assigned thereto such a shape as will remove the fruit from the pit while the pits are firmly held in the notches between the cutter blades and with a minimum of injury to the fruit itself. Here again, the separation of the fruit from its pit has been shown as occurring while the fruit is resting in its support.

Figure 9:
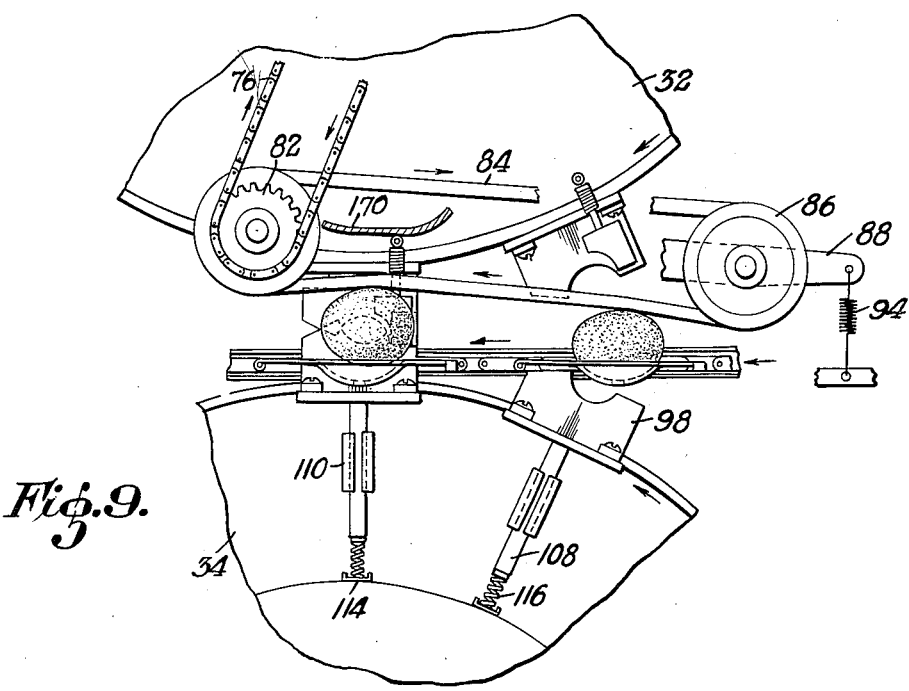
Fig. 9 is an enlarged fragmentary detail showing the cutter in another adjusted position.

A further modification of the separators has been illustrated in Figs. 9 and 10 where the separating action is effected with the fruit elevated above its support. In this case, the separators 162 are reciprocably supported on the opposed faces of the upper cutter blade 98, being normally biased upwardly by means of springs 164 interposed between suitable abutments on the cutter blades and collars 166 formed on the separator elements. The upper ends of the separators are out-turned to receive rollers 168 which, at a predetermined time, pass under a cam track 170 for each of them whereupon the separator elements are moved downwardly to effect a wedging action upon the two halves of the fruit to remove it from the pit while the latter is firmly grasped in the notches of the cooperating upper and lower cutter blades.

Instead of making the cutter blade unitary, each of them may be formed of two parts as depicted in Fig. 11 of the drawings. As clearly shown in this figure, there is provided a leading portion 172 provided with an inclined leading edge 102 and a trailing portion 174 corresponding more or less to the trailing portion of the integral blade depicted in Fig. 3. Here again the two portions are axially offset so as to assume an intersecting and overlapping relationship with respect to its complementary cutter blade mounted on the cooperating rotor. Each portion of the the cutter blade is in this case provided with a flange 176 perforated with a pair of openings 178 for the reception of bolts for suitable attachment to the rotors. As before, the cutting edges of the two portions constituting a blade are aligned and provided with notches 180 in which the pits are grasped during the removal of the fruit from the pit. The overlapping relationship of upper and lower cutter blades, achieved in this figure as well as in Fig. 3, assures proper alignment of the blades at all times thus avoiding deflection of the blades when they engage a pit.

Whereas only a relatively few modifications of this invention have been described, many more will suggest themselves to those skilled in the art as they have already been recognized by the present inventor. Accordingly, the invention should not be restricted to the examples shown and described by this application beyond the scope of the appended claims.

I claim:

1. Fruit handling apparatus comprising a conveyor providing a fruit support containing pockets, said pockets being discontinuous at least in part to define an elongated gap extending axially in the direction of movement of said conveyor, rotors disposed on opposite sides of said support, a series of opposed notched crossing and overlapping cutters radially disposed on each of said rotors and mounted to form pairs of cutters for penetration of fruit supported by said pockets from opposite surfaces of said support, one cutter of each pair mounted for radial movement on its rotor, a spring outwardly radially biasing said movable cutter, and means for driving said conveyor and introducing certain of said cutters into said pockets through said gap.

2. Fruit handling apparatus comprising a conveyor providing a fruit support containing pockets, said pockets being discontinuous at least in part to define an elongated gap extending axially in the direction of movement of said conveyor, rotors disposed on opposite sides of said support, a series of opposed notched crossing and overlapping cutters radially disposed on each of said rotors and mounted to form pairs of cutters for penetration of fruit supported by said pockets from opposite surfaces of said support, each cutter carried by one of said rotors being mounted for radial movement on its rotor, a spring outwardly radially biasing said movable cutter, and means for driving said conveyor and introducing certain of said cutters into said pockets through said gap.

3. Fruit handling apparatus comprising a conveyor providing a fruit support containing pockets, said pockets being discontinuous at least in part to define an elongated gap extending axially in the direction of movement of said conveyor, rotors disposed on opposite sides of said support, a series of opposed notched crossing and overlapping cutters radially disposed on each of said rotors and mounted to form pairs of cutters for penetration of fruit supported by said pockets from opposite surfaces of said support, one cutter of each pair mounted for radial movement on its rotor, a spring outwardly radially biasing said movable cutter, said cutters of each pair having their notched portions registrable for engagement with the pits of fruit received in said pockets, and means for driving said conveyor and introducing certain of said cutters into said pockets through said gap.

4. Fruit handling apparatus comprising a conveyor providing a fruit support containing pockets, said pockets being discontinuous at least in part to define an elongated gap extending axially in the direction of movement of said conveyor, rotors disposed on opposite sides of said support, a series of opposed notched crossing and overlapping cutters radially disposed on each of said rotors and mounted to form pairs of cutters for penetration of fruit supported by said pockets from opposite surfaces of said support, one cutter of each pair mounted for radial movement on its rotor, a spring outwardly radially biasing said movable cutter, each of said cutters comprising a pair of spaced blades having aligned cutting edges, and means for driving said conveyor and introducing certain of said cutters into said pockets through said gap.

5. Fruit handling apparatus comprising a conveyor providing a fruit support containing pockets, said pockets being discontinuous at least in part to define an elongated gap extending axially in the direction of movement of said conveyor, rotors disposed on opposite sides of said support, a series of opposed notched crossing and overlapping cutters radially disposed on each of said rotors and mounted to form pairs of cutters for penetration of fruit supported by said pockets from opposite surfaces of said support, one cutter of each pair mounted for radial movement on its rotor, a spring outwardly radially biasing said movable cutter, means relatively movable with respect to said cutters to separate pits from fruit, and means for driving said conveyor and introducing certain of said cutters into said pockets through said gap.

BROOK H. ROLLINS, JR.

REFERENCES CITED

The following references are of record in the file of this patent:

UNITED STATES PATENTS

| Number | Name | Date |
|---|---|---|
| 436,629 | Ish | Sept. 16, 1890 |
| 1,047,786 | Goldman | Dec. 17, 1912 |
| 1,075,547 | Caldwell | Oct. 14, 1913 |
| 1,261,704 | Clemson | Apr. 2, 1918 |
| 1,403,852 | Ensele | Jan. 17, 1922 |
| 1,432,282 | Elliott | Oct. 17, 1922 |
| 1,522,660 | Whiteside | Jan. 13, 1925 |
| 1,524,886 | Roberts | Feb. 3, 1925 |
| 1,526,635 | Groves | Feb. 17, 1925 |
| 2,071,667 | Thompson | Feb. 23, 1937 |
| 2,272,415 | McLauchlan | Feb. 10, 1942 |
| 2,314,066 | Ballou | Mar. 16, 1943 |

FOREIGN PATENTS

| Number | Country | Date |
|---|---|---|
| 29,123 | Great Britain | Dec. 18, 1912 |